United States Patent [19]

Germann

[11] 4,266,603
[45] May 12, 1981

[54] HEAT EXCHANGERS AND METHOD

[75] Inventor: Willy Germann, Wurenlos, Switzerland

[73] Assignee: BBC Brown, Boveri & Co., Ltd., Baden, Switzerland

[21] Appl. No.: 4,869

[22] Filed: Jan. 19, 1979

[30] Foreign Application Priority Data

Jan. 25, 1978 [CH] Switzerland ............................ 785/78

[51] Int. Cl.³ .............................................. F28F 1/22
[52] U.S. Cl. ............................... 165/171; 29/157.3 C; 138/171; 165/156
[58] Field of Search ............... 165/164, 168, 169, 171, 165/154, 156, 185, 183, 184; 29/157.3 C; 138/170, 171; 113/118 C, 118 R

[56] References Cited

U.S. PATENT DOCUMENTS

| 2,162,083 | 6/1939 | Highan et al. | 165/171 |
| 3,144,079 | 8/1964 | Mack | 165/171 |
| 3,384,167 | 5/1968 | Javkin | 165/171 |
| 3,387,653 | 6/1968 | Coe | 165/171 |
| 3,739,147 | 6/1973 | Mayhew et al. | 165/183 |

FOREIGN PATENT DOCUMENTS 499568 1/1954 Canada ..................................... 165/171

Primary Examiner—Sheldon J. Richter
Attorney, Agent, or Firm—Burns, Doane, Swecker & Mathis

[57] ABSTRACT

A heat exchanger preferably having spirally shaped cooling passages is described. The heat exchanger has the walls of the cooling passages formed first by two jaws spaced apart. The ends of the jaws are then joined together to form the fluid passage. The cooling passage is therefore integral with the base body.

1 Claim, 3 Drawing Figures

HEAT EXCHANGERS AND METHOD

BACKGROUND OF THE INVENTION

This invention relates to heat exchangers, and more particularly to the manufacture of heat exchangers.

It has previously been proposed to form heat exchangers by welding or brazing tubing on the surface that is to be heated or cooled. For example, in the case of turbogenerators with superconducting excitor windings, the excitor winding is cooled by liquid helium. The cold rotor body carrying the winding is installed within an external hot cylinder. The fastening of the inner rotor body and the transmission of torque to the shaft ends takes place through thin transition pieces which are also cooled by helium gas. Cooling could be accomplished by using cooling coils consisting of a spirally-wound tube which is welded, brazed or expanded onto the shaft ends. The disadvantage of this technique lies in the fact that the connecting seams between the tube and the shaft that is to be cooled are applied to a surface which is highly stressed, so that there is a danger that the joint between the tubing and the surface will separate. Such a joint is mechanically weak and does not provide good thermal conductivity between the cooling tube and the body that is to be cooled.

It is an object of this invention to provide a heat exchanger having relatively small cooling passages on the exterior of a larger body which can be manufactured efficiently and economically, and which has sufficient mechanical strength to withstand stresses between the cooling passages and the surface of the body.

This object is accomplished in accordance with a preferred embodiment of the invention by manufacturing a plurality of cooling passages on the exterior surface of the body. The passages when formed initially are open with outwardly projecting flanges. The flanges are then drawn together and welded to form closed passages integral with the base surface.

DESCRIPTION OF THE DRAWINGS

This preferred embodiment is illustrated in the accompanying drawings in which.

DETAILED DESCRIPTION OF THE PREFERRED EMBODIMENTS

Figure 1:
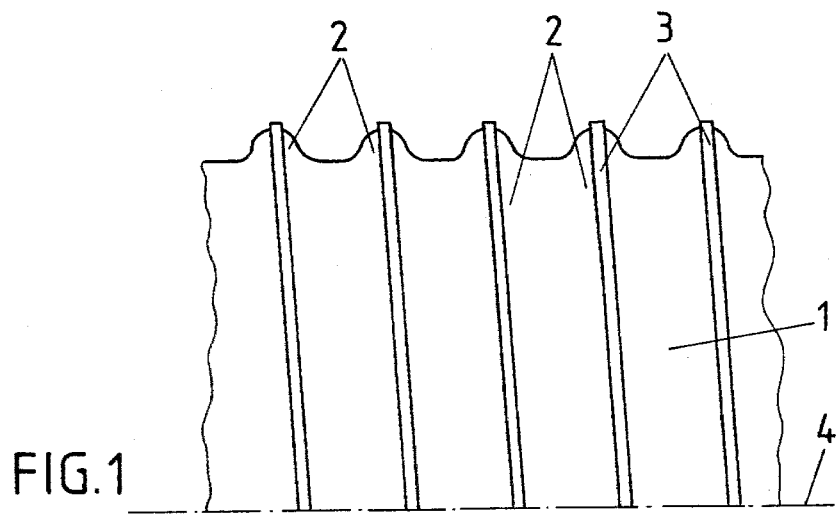
FIG. 1 is a side elevational view of a hollow shaft incorporating the heat exchanger of this invention.

The shaft end 1 of a turbogenerator rotor with superconducting excitor winding is shown in FIG. 1. The shaft end is in the form of a hollow cylinder which is provided with cooling coils 2 in accordance with this invention. The central axis of the cylindrical shaft end 1 is indicated at 4. The cooling coils 2 are arranged in a helical pattern.

Figure 2:
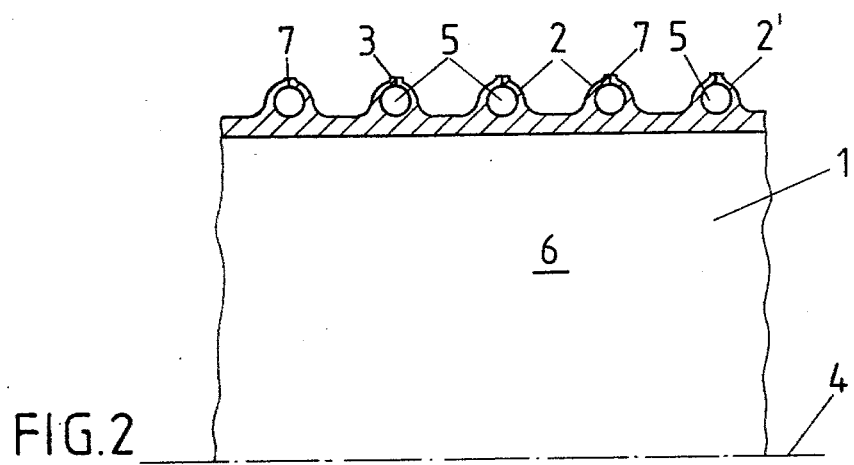
FIG. 2 is a cross-sectional view of the shaft in FIG. 1.
Figure 3:
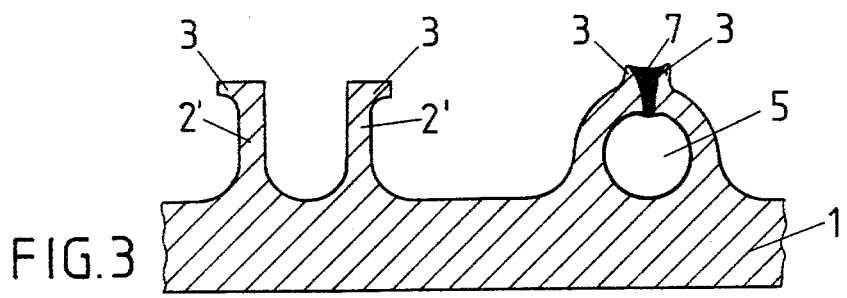
FIG. 3 is a detailed cross-sectional view of the heat exchanger showing the method of making the cooling passage.

As shown in FIGS. 2 and 3, the walls of the coils 2 are formed by jaws 2' which are joined together by a welded seam 7. The cooling passages in the coils are indicated at 5.

As shown at the left portion of FIG. 3, the jaws 2' of the cooling coil 2 are formed integrally with the cylinder 1. The jaws 2' project radially from the surface of the cylinder 1. Flanges 3 are formed at the outer end of each jaw 2'. The flanges 3 may be drawn together by any convenient arrangement, such as by two rails which engage the outer edge of the flanges to draw the flanges toward each other as the cylinder rotates.

As an alternative, a series of rollers may be arranged in pairs with progressively decreasing spacing between them to draw the flanges together. After the flanges have been displaced substantially into engagement with each other, the flanges are welded together, for example, by plasma welding or tungsten inner gas welding.

The welding operation heats the flanges 3 to a very high temperature, but since the weld 7 is spaced from the cylinder 1 by the walls of the cooling coils 2, the cylinder 1 is not exposed to the high welding temperatures and therefore, is not adversely affected by the welding operation.

Since the cooling passage 5 is formed integrally with the cylinder 1, the rate of thermal conductivity between the interior of the passage 5 and the interior of the cylinder 1 is not impeded. This integral structure also provides high mechanical strength between the cooling coils and the cylinder 1. The method of this invention also provides for a continuous operation for forming the coils, since the flanges 3 may be pressed together progressively, followed by welding of the joint as the cylinder 1 rotates. Thus, the coil 2 can be formed as a single continuous operation.

While this invention has been illustrated and described in accordance with a preferred embodiment, it is recognized that variations and changes may be made therein without departing from the invention as set forth in the claims. For example, the jaws 2' may have a different shape and the cooling passage 5 need not necessarily be circular in cross section. It is also possible to join the flanges together by other techniques, such as soldering and cemented bonds.

What is claimed is:

1. A heat exchanger comprising a base having opposite surfaces, a pair of walls extending outwardly from one of said base surfaces, said walls being joined by a seam extending longitudinally of said walls and cooperating with said walls to form an enclosed passage for fluid, said walls including flanges along said seam.

* * * * *